(12) United States Patent
Doshi et al.

(10) Patent No.: US 10,158,552 B2
(45) Date of Patent: Dec. 18, 2018

(54) DEVICE PROFILE-DRIVEN AUTOMATION FOR CELL-BASED TEST SYSTEMS

(71) Applicant: w2bi, Inc., South Plainfield, NJ (US)

(72) Inventors: Dinesh Doshi, South Plainfield, NJ (US); Mark Elston, San Jose, CA (US); Derek Diperna, Medford Lakes, NJ (US); Vipul Jain, South Plainfield, NJ (US); Liqun Liu, South Plainfield, NJ (US); Amit Kucheriya, South Plainfield, NJ (US); Ira Leventhal, San Jose, CA (US)

(73) Assignee: W2BI, INC., South Plainfield, NJ (US)

( * ) Notice: Subject to any disclaimer, the term of this patent is extended or adjusted under 35 U.S.C. 154(b) by 121 days.

(21) Appl. No.: 15/236,277

(22) Filed: Aug. 12, 2016

(65) Prior Publication Data

US 2018/0048555 A1 Feb. 15, 2018

(51) Int. Cl.
*H04L 15/16* (2006.01)
*H04L 12/26* (2006.01)
*H04L 29/08* (2006.01)
*H04W 88/02* (2009.01)

(52) U.S. Cl.
CPC ........... *H04L 43/50* (2013.01); *H04L 67/02* (2013.01); *H04L 67/10* (2013.01); *H04L 67/303* (2013.01); *H04W 88/02* (2013.01)

(58) Field of Classification Search
CPC ......... H04L 43/50; H04L 67/10; H04L 67/02; H04L 67/303
USPC ........ 709/202, 203, 219, 220, 224, 230, 250
See application file for complete search history.

(56) References Cited

U.S. PATENT DOCUMENTS

| | | | |
|---|---|---|---|
| 3,082,374 A | | 3/1963 | Buuck |
| 4,228,537 A | * | 10/1980 | Henckels ............... G06F 11/261 714/33 |
| 4,766,595 A | * | 8/1988 | Gollomp ............ G01R 31/3183 714/33 |
| 5,475,624 A | * | 12/1995 | West ............... G01R 31/318342 703/13 |
| 5,827,070 A | * | 10/1998 | Kershaw .................. G09B 7/02 434/118 |
| 6,522,995 B1 | | 2/2003 | Conti et al. |
| 7,406,645 B2 | * | 7/2008 | Nozuyama ....... G01R 31/31835 714/738 |
| 7,624,378 B2 | * | 11/2009 | Achlioptas .......... G06F 11/3688 714/37 |
| 7,810,001 B2 | | 10/2010 | Zhou et al. |
| 7,895,575 B2 | * | 2/2011 | Yoon ..................... H04L 41/145 717/124 |
| 8,054,221 B1 | | 11/2011 | Luong et al. |
| 8,283,933 B2 | | 10/2012 | Dasnurkar |

(Continued)

FOREIGN PATENT DOCUMENTS

WO 2013192118 12/2013

*Primary Examiner* — Michael Won

(57) ABSTRACT

To test user equipment at a cell-based test system, a type of user equipment to be tested is determined. A device profile for the type of the user equipment to be tested is accessed. The device profile includes, for example, a test script that can be used to control the user equipment during the testing. A test of the user equipment is performed at the cell-based test system. During the test, the user equipment is controlled according to the device profile in response to the software executing on a computer system.

18 Claims, 9 Drawing Sheets

(56) References Cited

U.S. PATENT DOCUMENTS

| | | |
|---|---|---|
| 8,310,385 B2 | 11/2012 | Dasnurkar |
| 8,325,614 B2 | 12/2012 | Poon et al. |
| 8,433,953 B1 | 4/2013 | Gaudette et al. |
| 8,577,813 B2 | 11/2013 | Weiss |
| 8,737,980 B2 | 5/2014 | Doshi et al. |
| 8,856,539 B2 | 10/2014 | Weiss |
| 8,983,394 B2 | 3/2015 | Deforge et al. |
| 9,065,556 B2 | 6/2015 | Popescu et al. |
| 9,100,826 B2 | 8/2015 | Weiss |
| 9,116,873 B2 | 8/2015 | Majumdar et al. |
| 9,185,675 B2 | 11/2015 | Chen et al. |
| 9,253,242 B2 | 2/2016 | Macalet et al. |
| 9,446,519 B2 | 9/2016 | Gray et al. |
| 9,469,037 B2 | 10/2016 | Matthews et al. |
| 9,481,084 B2 | 11/2016 | Park |
| 9,530,137 B2 | 12/2016 | Weiss |
| 9,544,910 B2 | 1/2017 | Delsol et al. |
| 9,596,166 B2 | 3/2017 | Iyer et al. |
| 9,652,077 B2 | 5/2017 | Jenkinson |
| 9,767,009 B2 * | 9/2017 | Cobb, Jr. ............ G06F 11/3688 |
| 10,025,883 B2 | 7/2018 | Paule et al. |
| 2001/0003209 A1 * | 6/2001 | Sato ............... G01R 31/318342 716/136 |
| 2002/0072359 A1 * | 6/2002 | Moles ................... H04W 24/00 455/425 |
| 2002/0116507 A1 | 8/2002 | Manjure et al. |
| 2002/0165952 A1 * | 11/2002 | Sewell ................ H04L 41/0266 709/224 |
| 2004/0012529 A1 | 1/2004 | Teshirogi et al. |
| 2005/0060132 A1 * | 3/2005 | Hollander ....... G01R 31/318307 703/14 |
| 2005/0083068 A1 | 4/2005 | Clarridge et al. |
| 2006/0075305 A1 * | 4/2006 | Robinson ............ G06F 11/3684 714/38.1 |
| 2006/0250972 A1 * | 11/2006 | Seebacher ............... H04L 43/50 370/242 |
| 2006/0288243 A1 * | 12/2006 | Kim ...................... G06F 1/3203 713/300 |
| 2007/0050166 A1 * | 3/2007 | Spinner .............. G01R 31/2848 702/108 |
| 2007/0150250 A1 * | 6/2007 | Inoue .................. G06F 17/5036 703/14 |
| 2007/0281684 A1 | 12/2007 | Parmar et al. |
| 2007/0294580 A1 * | 12/2007 | Lu .................. G01B 31/318357 714/33 |
| 2008/0072050 A1 * | 3/2008 | Klonover ................ H04L 43/50 713/176 |
| 2008/0081608 A1 | 4/2008 | Findikli et al. |
| 2008/0238430 A1 * | 10/2008 | Page ................... G01R 27/2605 324/425 |
| 2008/0263410 A1 | 10/2008 | Mittal et al. |
| 2008/0313313 A1 | 12/2008 | Doshi et al. |
| 2008/0319728 A1 * | 12/2008 | Bruski ............... G05B 23/0256 703/13 |
| 2009/0063062 A1 * | 3/2009 | Takamatsu ......... G01R 31/3193 702/58 |
| 2009/0112505 A1 | 4/2009 | Engel et al. |
| 2009/0119084 A1 * | 5/2009 | Nagashima ...... G01R 31/31907 703/14 |
| 2009/0215444 A1 * | 8/2009 | Topaltzas ............ H04W 24/06 455/425 |
| 2009/0216495 A1 * | 8/2009 | Fujiwara ............... F01K 13/006 702/184 |
| 2009/0217100 A1 * | 8/2009 | Grechanik ............. G06F 11/368 714/38.1 |
| 2009/0249284 A1 | 10/2009 | Antosz et al. |
| 2009/0265035 A1 | 10/2009 | Jenkinson et al. |
| 2009/0276190 A1 * | 11/2009 | Bell, Jr. ......... G01R 31/318357 703/1 |
| 2009/0312009 A1 | 12/2009 | Fishel |
| 2010/0075664 A1 * | 3/2010 | Maucksch ............ H04W 24/06 455/425 |
| 2010/0113011 A1 | 5/2010 | Gregg et al. |
| 2010/0134090 A1 * | 6/2010 | Burns ................... F41A 17/063 324/72 |
| 2010/0240317 A1 | 9/2010 | Giles et al. |
| 2010/0299419 A1 * | 11/2010 | Ramankutty ......... H04W 24/02 709/221 |
| 2011/0025337 A1 | 2/2011 | Morrow et al. |
| 2011/0151863 A1 | 6/2011 | Shaw et al. |
| 2011/0178766 A1 | 7/2011 | York et al. |
| 2011/0293840 A1 | 12/2011 | Newkirk et al. |
| 2012/0131515 A1 | 5/2012 | Rice |
| 2012/0139571 A1 * | 6/2012 | Nickel ............... G01R 29/0821 324/750.26 |
| 2012/0146956 A1 | 6/2012 | Jenkinson |
| 2012/0280934 A1 | 11/2012 | Ha et al. |
| 2012/0282891 A1 | 11/2012 | Mohammed et al. |
| 2012/0300649 A1 | 11/2012 | Parmar et al. |
| 2013/0047038 A1 * | 2/2013 | Huang ................ G06F 11/0748 714/38.1 |
| 2013/0078983 A1 | 3/2013 | Doshi et al. |
| 2013/0104105 A1 * | 4/2013 | Brown ................ G06F 11/3664 717/124 |
| 2013/0179865 A1 * | 7/2013 | Neumeyer ............ G06F 11/368 717/127 |
| 2013/0183898 A1 | 7/2013 | Strid |
| 2013/0227348 A1 | 8/2013 | Stephenson et al. |
| 2013/0273853 A1 * | 10/2013 | Reed ..................... H04W 24/00 455/67.11 |
| 2013/0275072 A1 * | 10/2013 | Arnold ............... G01R 31/2889 702/108 |
| 2013/0294255 A1 | 11/2013 | Olgaard et al. |
| 2013/0345864 A1 | 12/2013 | Park |
| 2014/0111484 A1 | 4/2014 | Welch et al. |
| 2014/0122009 A1 | 5/2014 | Meiyappan |
| 2014/0305224 A1 | 10/2014 | Zhang et al. |
| 2014/0379935 A1 | 12/2014 | Venkatasubramaniam et al. |
| 2014/0380281 A1 | 12/2014 | McLaughlin |
| 2015/0003505 A1 | 1/2015 | Lusted et al. |
| 2015/0024720 A1 * | 1/2015 | Efrati ..................... H04W 12/02 455/414.1 |
| 2015/0175005 A1 * | 6/2015 | Wilding ................. B60K 37/06 701/36 |
| 2015/0178421 A1 * | 6/2015 | Borrelli ............... G06F 17/5009 703/7 |
| 2015/0297991 A1 | 10/2015 | Mahlmeister et al. |
| 2015/0301108 A1 * | 10/2015 | Hamid ................ G01R 31/3177 714/724 |
| 2016/0044520 A1 | 2/2016 | Iyer et al. |
| 2016/0134737 A1 | 5/2016 | Pulletikurty |
| 2016/0187876 A1 | 6/2016 | Diperna et al. |
| 2016/0187877 A1 | 6/2016 | Diperna et al. |
| 2016/0192213 A1 | 6/2016 | Diperna et al. |
| 2016/0320889 A1 | 11/2016 | Jenkinson |
| 2016/0337053 A1 | 11/2016 | Diperna et al. |
| 2016/0356800 A1 * | 12/2016 | Glavina ............ G01N 35/00623 |
| 2017/0052527 A1 | 2/2017 | Dougherty et al. |
| 2017/0063474 A1 * | 3/2017 | Humphrey ......... H04B 17/0085 |
| 2017/0111258 A1 * | 4/2017 | Bezold ................... H04L 43/50 |
| 2017/0126539 A1 * | 5/2017 | Tiwari ................... H04L 43/50 |
| 2017/0149634 A1 * | 5/2017 | Bezold ................. H04L 43/045 |
| 2017/0242129 A1 * | 8/2017 | Kallankari ............ G01R 29/105 |
| 2017/0300402 A1 * | 10/2017 | Hoffner ............... G06F 11/3612 |
| 2018/0024847 A1 * | 1/2018 | Campbell ............ G06F 9/4446 715/708 |
| 2018/0026840 A1 * | 1/2018 | Toepke ............... H04L 41/0806 |
| 2018/0048555 A1 | 2/2018 | Doshi et al. |
| 2018/0049050 A1 | 2/2018 | Doshi et al. |
| 2018/0049051 A1 | 2/2018 | Doshi et al. |
| 2018/0049052 A1 | 2/2018 | Doshi et al. |
| 2018/0049054 A1 | 2/2018 | Doshi et al. |
| 2018/0066301 A1 * | 3/2018 | Karlsson .................. G01N 21/27 |
| 2018/0316443 | 11/2018 | Diperna et al. |

* cited by examiner

DEVICE PROFILE-DRIVEN AUTOMATION FOR CELL-BASED TEST SYSTEMS

RELATED U.S. APPLICATIONS

This application is related to the following U.S. patent applications, all of which are hereby incorporated by reference in their entirety: U.S. patent application Ser. No. 15/236,326, "Local Portable Test Systems and Methods," by D. Doshi et al.; U.S. patent application Ser. No. 15/236,315, "Automated Configurable Portable Test Systems and Methods," by D. Doshi et al.; U.S. patent application Ser. No. 15/236,314, "Automated Validation and Calibration Portable Test Systems and Methods," by D. Doshi et al.; and U.S. patent application Ser. No. 15/236,292, "Cloud-Based Services for Management of Cell-Based Test Systems," by D. Doshi et al.

BACKGROUND

In telecommunication applications, user equipment (UE) typically refers to devices such as smartphones, tablets, laptops, and other types of devices that provide end users with many different capabilities including the capability to communicate and exchange content with each other and with Web servers over a network. The definition of user equipment can be expanded to also include the Internet-of-things (IoT), which are devices that provide the capability to collect and exchange data amongst themselves and with servers over a network. User equipment can communicate over networks through a wired or wireless medium using different types of network protocols such as but not limited to the 3rd Generation Partnership Project (3GPP) Long-Term Evolution (LTE) standard.

The number of UE devices is growing rapidly. New types of devices and new versions of existing types of devices, with diverse capabilities, are continuously and rapidly being introduced. Thorough testing of the devices under many different scenarios is essential to verify that the devices will function correctly.

Automated testing is usually relied upon because it is scalable to large numbers of devices and can be accomplished quicker, more systematically, and at less expense than, for example, manual testing. This is turn can increase test coverage and reduce time-to-market, increasing reliability while reducing the cost to both manufacturers and consumers.

However, there are aspects of conventional automated testing paradigms that are costly. Automated testing is currently performed in large-scale, centralized laboratories that include a shielded room that prevents radio frequency (RF) signals that might interfere with the testing from entering or escaping. Devices to be tested are shipped in quantity to the laboratories, which can contribute to the cost of testing. While automated to a large degree, aspects of the testing still require significant manual support, such as equipment maintenance, test case delivery, device profile delivery, test data collection, data analytics and reporting, and consulting, for example. These factors contribute significantly to the cost of testing.

SUMMARY

Instead of large-scale, centralized laboratories, embodiments according to the present invention introduce smaller, cell-based test systems that can be deployed at many different locations such as original equipment manufacturer (OEM) sites and operator laboratories. Each test system includes one or more portable test units (e.g., shielded boxes) that can be communicatively coupled to a local control component (e.g., a computer system). To test some types of devices such as smartphones, the cell-based test systems can each also include one or more network access point simulators (e.g., base stations). The user equipment to be tested can be placed inside a portable test unit, and automated testing is performed under control of software that executes on the computer system.

The computer system that executes the testing, or another computer system communicatively coupled to the first computer system, can upload and download information to a centralized server via a network (e.g., the Internet). In other words, embodiments according to the invention utilize cloud-based services to manage the cell-based test systems individually and collectively.

Relative to conventional test laboratories, the portability of the cell-based test systems means that they are less costly, more scalable, more quickly deployed and updated, and allow more flexible test coverage. The use of cloud-based services to manage the cell-based test systems increases the degree of test automation and decreases the amount of manual support needed. Testing can be performed at manufacturing sites, so that devices to be tested do not have to be shipped to testing laboratories. Overall, the cell-based test systems can reduce time-to-market and overall cost without affecting test coverage and product reliability.

To test user equipment at a cell-based test system, a type of user equipment to be tested is determined. A device profile for the type of the user equipment to be tested is accessed. The device profile can be accessed from a server in the cloud, or it can be accessed from a local repository in or accessible to the cell-based test system. The device profile includes, for example, a test script that can be used to control the user equipment during the testing. A test of the user equipment is performed at the cell-based test system. During the test, the user equipment is controlled according to the device profile in response to the software executing on a computer system.

More specifically, in an embodiment, the user equipment to be tested is connected to a cell-based test system. The cell-based test system is then configured and initialized. In an embodiment, before the user equipment to be tested is connected to the cell-based test system, characteristics of the cell-based test system are measured using reference user equipment and stored.

Profile information (e.g., type, make, model, and/or features) for the user equipment to be tested is determined. The profile information is sent to a server over a network. In response, a device profile that is selected based on the profile information is received from the server over the network.

The device profile has the intelligence that is required to control a given type of user equipment being tested. The device profile may be a standard application program interface (API) or an API adapted by the OEM. The device profile has the intelligence to automatically switch from a first automation mode that uses, for example, the ADB command, to another automation mode that uses, for example, the AT command.

One or more test cases are also received from the server over the network. Each of these test cases is also selected based on the profile information sent to the server.

The test cases are then performed on the user equipment. In an embodiment, the previously measured and stored information about the characteristics of the cell-based test system can be downloaded and used to calibrate the test system. During performance of the test case, the user equipment is controlled according to the device profile in response to software executed by the cell-based test system. Thus, the information from the downloaded test profile is used by the cell-based test system to perform appropriate test automation during execution of the test case.

In an embodiment, test results are sent to the server over the network.

Storing device profiles on a server (in the cloud) provides a number of benefits and advantages. The correct device profiles can be quickly identified and delivered. New device profiles can be developed, validated, and quickly and widely distributed. Storing devices in a local repository at the cell-based test system is also advantageous. For example, device profiles can be accessed even if there is no connectivity to the cloud.

Furthermore, as noted above, the intelligence included in device profiles in embodiments according to the invention solves the challenges associated with automated testing of user equipment in which the automation does not follow a single standard mechanism but instead has multiple automation modes.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
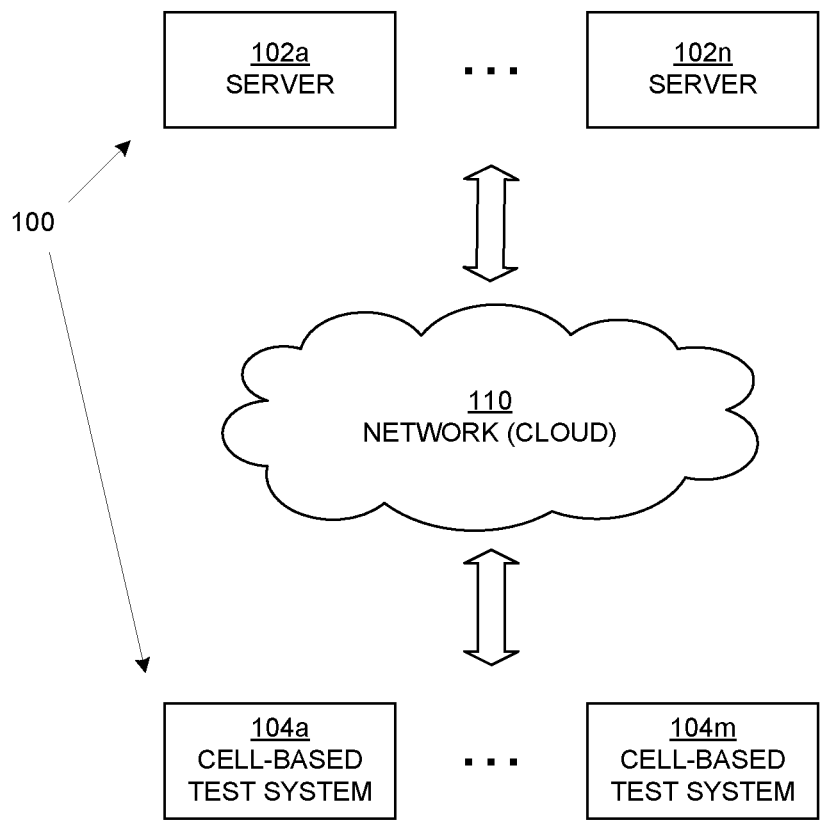
FIG. 1 is a block diagram illustrating an example of a network or system that can be used to implement cloud-based services for managing cell-based test systems in an embodiment according to the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "storing," "sending," "selecting," "accessing," "comparing," "using," "determining," "generating," "performing," "controlling," "executing," "using," "measuring," "installing," "initializing," "configuring," or the like, refer to actions and processes (e.g., flowcharts 600 and 700 of FIGS. 6 and 7, respectively) of an apparatus or computer system or similar electronic computing device or processor (e.g., the computer system 800 of FIG. 8). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram illustrating an example of a network or system 100 that can be used to implement cloud-based services for managing cell-based test systems in an embodiment according to the invention. In the example of FIG. 1, the system 100 includes a remote management environment that includes a number of servers 102a-102n, and also includes a local test environment that includes a number of cell-based test systems 104a-104m. For simplicity, the following discussion may refer to a single server 102a and a single cell-based test system 104a, but that discussion can be readily extrapolated to the use of multiple servers and multiple cell-based test systems. The servers 102a-102n and the cell-based test systems 104a-104m are communicatively coupled (wired or wirelessly) via a network 110 (e.g., the public Internet, but not so limited). The network 110 may be a cloud-enabled network or a cloud-based network.

Figure 2:
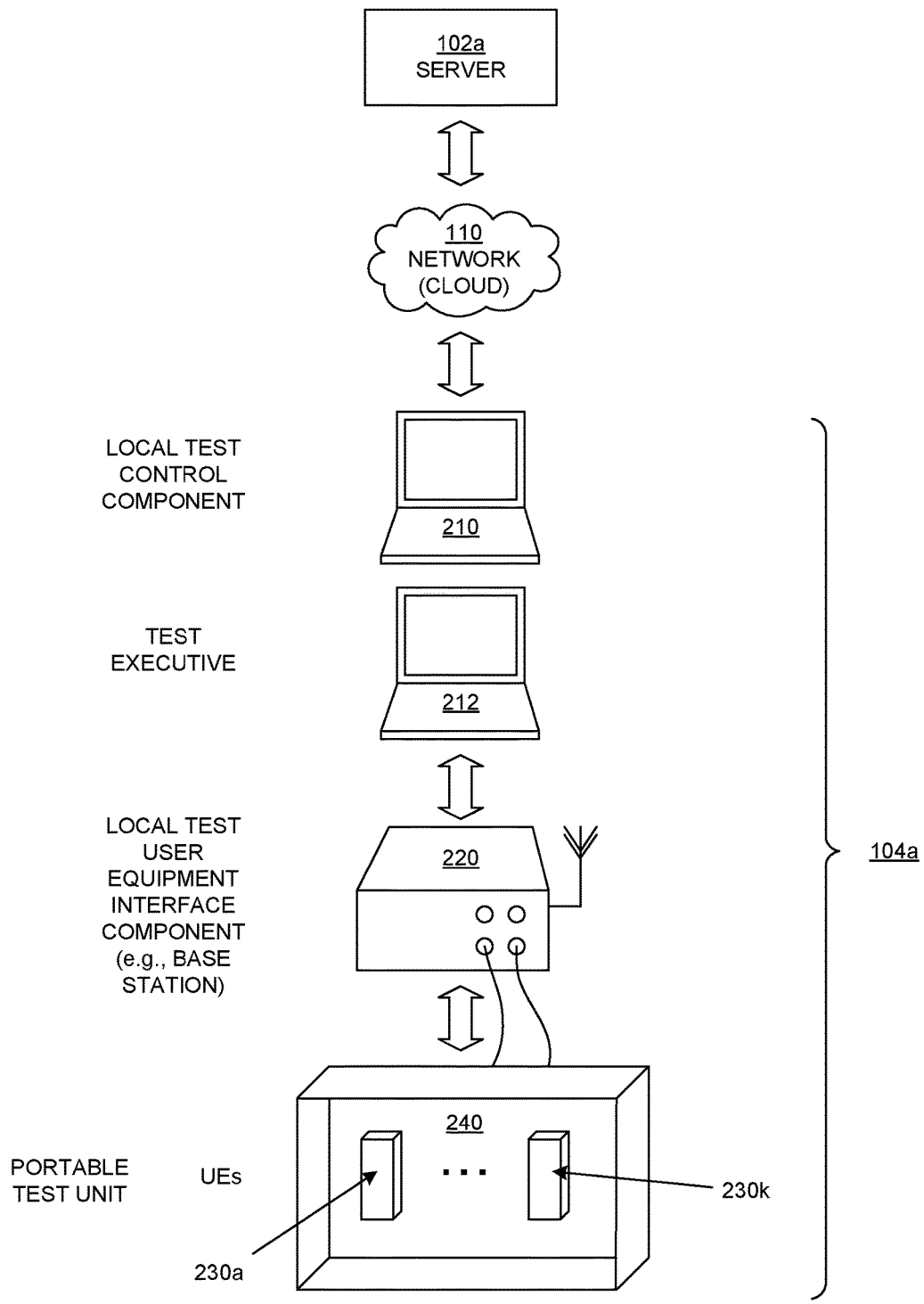
FIG. 2 illustrates elements of a cell-based test system in an embodiment according to the invention.

FIG. 2 illustrates elements of a cell-based test system 104a in an embodiment according to the invention. The cell-based test system 104a includes one or more local test control components, one or more local test user equipment interface components, and one or more portable test units.

In an embodiment, each local test control component is implemented on a computer system 210. In an embodiment, the local test control component is implemented as a virtual machine on the computer system 210. The computer system 210 can communicate with (is communicatively coupled to) the network (cloud) 110 to enable and facilitate the use of cloud-based services to manage the cell-based test system 104a, as will be described more fully below.

In general, a local test control component is configured to direct the local test user equipment interface component(s) and to control test interactions with the user equipment 230a-230k to be or being tested, and a local test user equipment interface component is operable for communicating with the user equipment during testing. The local test control component on the computer system 210 is used for test automation, including test case execution automation, user equipment automation, and test equipment automation. The local control component on the computer system 210 is also used for collecting and reporting test results to the server 102a, and may analyze and present (e.g., display) the test results. In an embodiment, the computer system 210 is or emulates an Internet Protocol (IP) Multimedia Subsystem or IP Multimedia Core Network Subsystem (IMS) server as described by 3GPP. These and other functions of the computer system 210 are presented further below.

In an embodiment, a second computer system 212 (e.g., a laptop) is used to implement and execute a network control plane simulator or test executive. In an embodiment, the test executive is an Evolved Packet Core (EPC), also known as a System Architecture Evolution (SAE) Core. The EPC can be used for testing voice-and-data devices (e.g., smartphones) and operates in accordance with contemporary standard(s) appropriate for the type of user equipment being tested, such as the 3rd Generation Partnership Project (3GPP) Long-Term Evolution (LTE) standard. A test executive or network control plane simulator for other, non-3GPP systems such as WiFi™, WIMAX (Worldwide Interoperability for Microwave Access), and CDMA2000 can also be implemented on the computer system 212.

In an embodiment, the computer system 210 and the computer system 212 communicate over an Ethernet connection. In another embodiment, the test executive (e.g., the EPC) is implemented on the computer system 210 instead of the second computer system 212. For example, the test executive (e.g., the EPC) can be executed as a virtual machine on the computer system 210.

In an embodiment, each local test user equipment interface component is a network access point simulation component implemented as, for example, a base station 220. In one such embodiment, a base station 220 is or simulates an LTE Evolved Node B (eNodeB). In general, a base station 220 is implemented as a small cell or femtocell. A base station 220 can have both wired and wireless connections to connect to the user equipment 230a-230k.

As noted above, each cell-based test system can include one or more local test user equipment interface components (one or more base stations). Test configurations in which multiple base stations are connected to one test executive (e.g., EPC) and in which one base station is connected to one test executive (e.g., EPC) are supported.

In an embodiment, the base station 220 communicates with the test executive (e.g., the EPC) via an Ethernet connection. The base station 220 and the test executive (e.g., the EPC) can be operated in a normal mode (e.g., to support a normal call flow) or error conditions may be injected, depending on the requirements of the test cases.

One or more items of user equipment (UEs) 230a-230k can be communicatively coupled (wired or wirelessly) to each base station in the cell-based test system 104a. In an embodiment, there are 32 UEs coupled to each base station, although the invention is not so limited. The UEs (which also may be referred to as devices under test) can be, but are not limited to, telecommunication devices (e.g., smartphones) and Internet-of-things (IoT) devices (e.g., sensors and meters).

In an embodiment, the user equipment to be tested is placed inside a portable test unit. In an embodiment, the portable test unit is implemented as a shielded box 240. Like the other elements of the cell-based test system 104a, the shielded box 240 is portable. For example, the shielded box 240 can be about 24 by 24 by 24 inches in size.

The shielded box 240 illustrated in FIG. 2 has an open front to show the UEs 230a-230k that are inside. However, during testing, the opening is closed by a cover or door (not shown). The shielded box 240 allows radio frequency (RF) signals to pass back-and-forth between the base station 220 and the user equipment 230a-230k inside the shielded box. The shielded box 240 can also include pass-through connectors (e.g., Universal Serial Bus connectors) that allow the base station 220 to communicate with the user equipment 230a-230k in the shielded box using cables. Similar connectors on the shielded box 240 can also be used to connect power cables to the user equipment 230a-230k inside the shielded box.

Figure 3A:
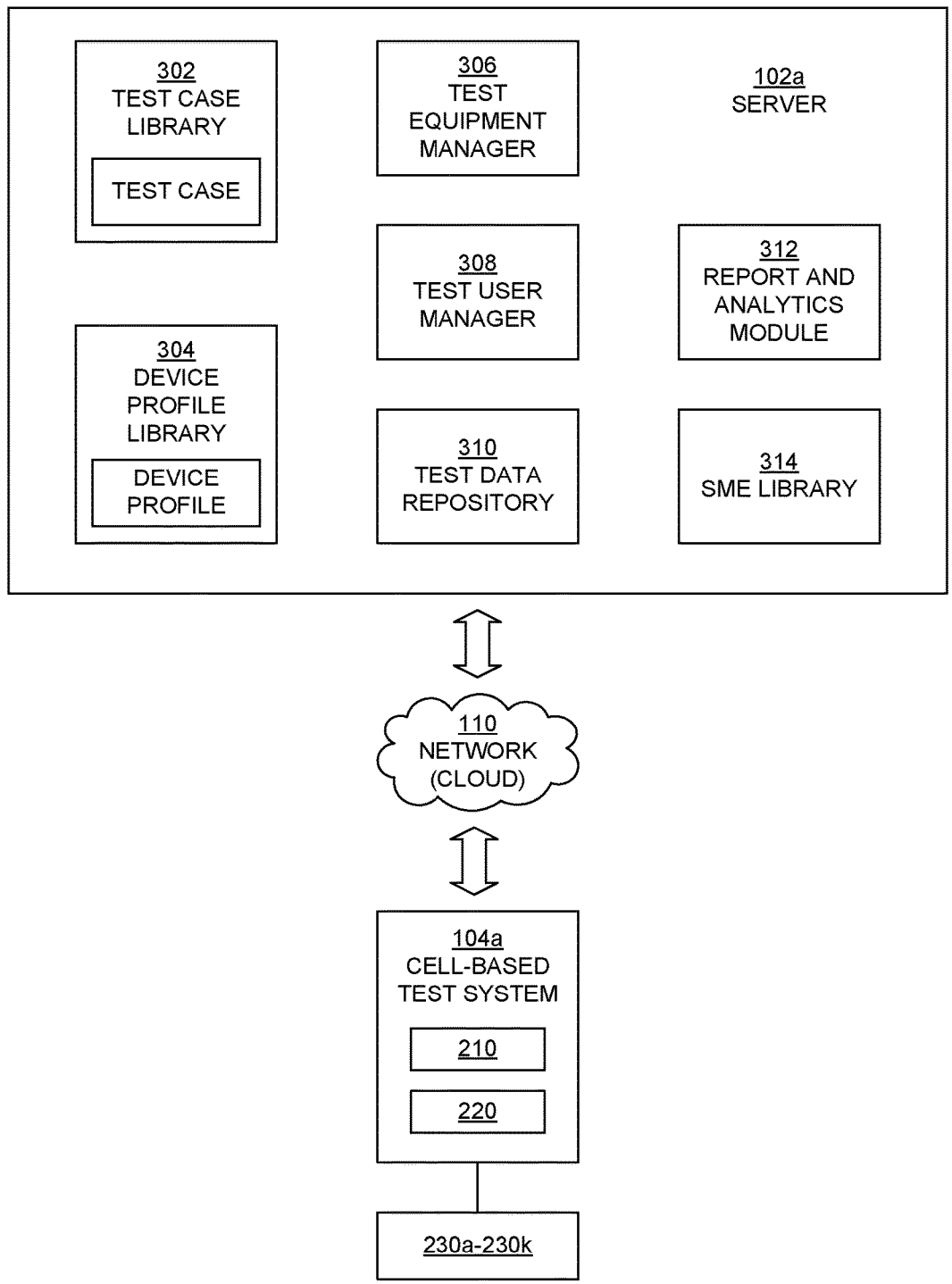
FIG. 3A is a block diagram illustrating elements of a server that provides cloud-based services for managing cell-based test systems in an embodiment according to the invention.

FIG. 3A is a block diagram illustrating elements of a server 102a that provides cloud-based services for managing cell-based test systems in an embodiment according to the invention. The server 102a can be communicatively coupled to the cell-based test systems 104a-104m over the public Internet (the network 110, or cloud).

In the example of FIG. 3A, the server 102a includes the following modules: a test case library 302, a device profile library 304, a test equipment manager 306, a test user manager 308, a test data repository 310, a report and analytics module 312, and a subject matter expert (SME) library 314. The functions associated with each of these modules are presented below. While these elements and their functionality are described as separate modules, the modules can be combined in any manner.

The test case library 302 includes a library of different test cases that can be executed using the cell-based test systems 104a-104m. Test cases may also be known as user equipment conformance tests. A test case may specify the purpose of the test, the standards-based requirement being tested, a procedure for performing the test, starting conditions, and pass criteria. As new test cases are developed, they can be readily added to the cloud-based test case library 302. Standard industry test cases are specified by organizations such as 3GPP. Customized test cases may be specified by users (e.g., manufacturers or operators) or developed for users based on their test requirements and specifically for their products.

The cell-based test system 104a, for example, can send profile information to the server 102a that identifies, for example, the type, make, model, and/or features of user equipment to be tested. Based on the profile information, the server 102a selects one or more test cases appropriate to the user equipment to be tested. The server 102a can then access the selected tests cases in the test case library 302 and send them over the network 110 to the cell-based test system 104a. That is, the selected test case or test cases are downloaded from the cloud to the cell-based test system 104a. The cell-based test system 104a can then automatically perform the test case(s) on the user equipment. Test results can be stored by the cell-based test system 104a (at least temporarily), then securely uploaded via the cloud (over the network 110) to the server 102a and stored in the test data repository 310.

Instead of, or in addition to, storing test cases in the test case library 302 on the server 102a, the test cases can be stored locally at the cell-based test system 104a (e.g., in a local repository in memory of the computer system 210). This allows the cell-based test system 104a to be used if there is no connectivity to the cloud (the network 110).

The device profile library 304 includes a library of different device profiles that can be executed on the cell-based test systems 104a-104m. Device profiles are developed and validated and then stored in the cloud (in the device profile library 304 on the server 102a), and then downloaded for testing.

More specifically, the cell-based test system 104a can send profile information to the server 102a that identifies, for example, the type, make, model, and/or features of the user equipment to be tested. In response, the device profile corresponding to the profile information (that is, appropriate for the, e.g., type, make, model, and/or features of the user equipment to be tested) is selected and accessed in the device profile library 304 (FIG. 3A) and sent from the server 102a over the network 110 to the cell-based test system 104a. That is, the selected device profile is downloaded from the cloud to the cell-based test system 104a. The cell-based test system 104a can then automatically use the device profile to perform the test case(s) on the user equipment.

A device profile has the intelligence that is required to control a given type of user equipment being tested. A device profile may be a standard application program interface (API) or an API adapted by an original equipment manufacturer (OEM). In essence, a device profile is or includes a test script that adapts the generalized software (test code) executed by the computer system 210 to the specific type, make, model, and/or features of the user equipment being tested. When one type of user equipment is being tested by the cell-based test system 104a, the device profile for that type of user equipment is executed; when a different type of user equipment is swapped into that cell-based test system, the device profile for the different type of user equipment is swapped in as well and executed in place of the other device profile.

More specifically, at the cell-based test system 104a, the device profile (e.g., API) is downloaded to the computer system 210, receives a command from the server, adapts the command to the user equipment 230a-230k being tested, executes the command on the user equipment, and responds to the computer system 210 with the result of the command execution. The device profile has the intelligence to automatically switch from a first automation mode that uses commands for a first operating system (e.g., Android™) to a second automation mode that uses commands for a second, different operating system (e.g., iOS). For example, one automation mode may use the ADB command, while another automation mode may use the AT command, in which case the device profile has the intelligence to determine which command to use and then to properly adapt the command from the computer system 210 according to the type of command used by the automation mode.

As new types, makes, models and/or features of devices are introduced, new device profiles can be written, validated, and added to the device profile library 304. Users can also modify a device profile and upload the modification and/or the modified device profile to the server 102a. Once validated, the modified device profile can be added to the device profile library 304 and shared with other users to improve the test process for the other users. In this manner, the cloud-based device profile library 304 acts like a marketplace for new and improved automation details. Alternatively, the modified device profile can be kept private to the user that developed it.

Instead of, or in addition to, storing device profiles in the device profile library 304 on the server 102a, the device profiles can be stored locally at the cell-based test system 104a (e.g., in a local repository in memory of the computer system 210). This allows the cell-based test system 104a to be used if there is no connectivity to the cloud (the network 110). The local repository of device profiles can be updated via the cloud or by some other means (e.g., using a file or database on a shipped physical storage device).

The test equipment manager 306 stores, issues, and transmits test software (e.g., the test executive (e.g., the EPC)) to the cell-based test systems 104a-104m (specifically, to the computer system 210). That is, the software is downloaded from the cloud to the cell-based test systems 104a-104m. The test equipment manager 306 can also store, issue, and transmit (download) test configuration information, which can include user equipment control configuration information, to the cell-based test systems 104a-104m.

The test equipment manager 306 can also deliver (download) updates to the software (e.g., the test executive (e.g., the EPC)) already present at the cell-based test systems 104a-104m. Updates can be downloaded to each of the cell-based test systems 104a-104m. In an embodiment, information about which updates to download and apply is embedded in the software applications, so that the applications and/or an authorized user can determine which updates to apply and when to apply them. In another embodiment, the server 102a accesses the cell-based test systems 104a-104m to determine, for example, what software and software version is present on each test system, then determines what additional software, or what software updates, need to sent to each test system, and then automatically downloads the appropriate software and/or software updates to the respective test systems. In an embodiment, the server 102a (e.g., the test equipment manager 306) maintains a record or log of the software present on each of the cell-based test systems 104a-104m and uses that information to determine whether and what type of software and/or software update is needed. Also, software updates (such as a patch) that are appropriate across all of the cell-based test systems 104a-104m can be automatically downloaded to the test systems.

In an embodiment, configuration of the local test control component and local test user equipment interface on the cell-based test systems 104a is automated using the information downloaded from the test equipment manager 306. Software and software updates—including the test executive (e.g., the EPC), test cases, device profiles, etc.—are automatically installed and initialized. Software and software updates for configuring the computer system 210 and/or the computer system 212 according to the given configuration can also be automatically installed, configured, and initialized. Calibration can then be automatically performed, and test cases can be executed to verify successful installation and operation.

In an embodiment, reference user equipment (a reference component) is used to calibrate the cell-based test system 104a. The reference user equipment is a trusted component with reliable and known communication characteristics and features. The reference user equipment can be configured to simulate at least a portion of the functionality of the user equipment 230a-230k to be tested. In such an embodiment, information about characteristic(s) of the cell-based test system 104a measured using the reference user equipment is received and stored by the test equipment manager 306. That is, the information about the characteristic(s) of the cell-based test system 104a is uploaded to and stored in the cloud. Prior to the cell-based test system 104a performing a test case or test cases on the user equipment 230a-230k to be tested, that information is sent from the server 102a over the network 110 to the cell-based test system (the information is downloaded from the cloud to the cell-based test system) and used before and during testing for calibration purposes, for example.

For example, signal loss between the base station 220 and the reference user equipment can be measured, then uploaded to and stored in the cloud. Prior to testing, the signal loss information can be downloaded to the cell-based test system 104a. During testing, the cell-based test system 104a can be calibrated to properly compensate for the signal loss by appropriately varying the signal strength between the base station 220 and the user equipment 230a-230k being tested. Other characteristics besides signal loss can be measured and uploaded to the cloud (e.g., the server 102a). Those characteristics can be generally referred to as physical layer characteristics, protocol characteristics, and data characteristics. In addition to signal loss, physical layer characteristics include, but are not limited to, RF signal power, RF signal frequency, and bandwidth. Protocol characteristics include, but are not limited to, scheduling and security aspects. Data characteristics include, but are not limited to, data throughput. In general, these characteristics can be measured, the measurement results can be uploaded to and stored in the cloud, and the results can be subsequently downloaded to calibrate the cell-based test system 104a prior to and during testing.

The test user manager 308 can manage account information for each of the users of the cell-based test system 104a. A "user" may be, for example, an entity that has purchased, licensed, or leased a cell-based test system or an authorized representative of such an entity. The test user manager 308 can store and enforce access information (e.g., user identifiers and passwords) that is used to control access to the account information. The account information may include licensing information, test data/results and reports (stored in the test data repository 310), and other information. The account information, in addition to being accessed on the on the server 102a (via the cloud), can be downloaded to the cell-based test systems 104a-104m and/or to a computer system or server designated by the user. For example, if a user purchases a time-based extension to their current license, such a purchase can be made online via the test user manager 308, and the user can then download a new license file from the test user manager.

Results from performing the test case(s) on the user equipment are stored in the cloud in the test data repository 310 on the server 102a. That is, test results are received at the server 102a from the cell-based test system 104a over the network 110 and stored at the server. The test results stored in the test data repository 310 can be accessed by authorized users as noted, and can also be downloaded to any computer system or server designated by the user. A report based on the test results can be prepared and stored in the test data repository 310 on the server 102a (in the cloud) and subsequently accessed and downloaded by authorized users.

In an embodiment, results from performing test cases on different types, makes, models, and features of user equipment at multiple cell-based test systems are received at the server 102a from those test systems over the network 110. In such an embodiment, the report and analytics module 312 compares and summarizes the results for the different user equipment. Thus, test results from different cell-based test systems can be uploaded to the cloud and compared, and the results of the comparisons can be subsequently accessed and downloaded by authorized users.

In an embodiment, the SME library 314 is available to be readily accessed for consultation by authorized users via the cloud (over the network 110) and downloaded. Authorized users can also add new information to the SME library 314 and update existing information.

Figure 3B:
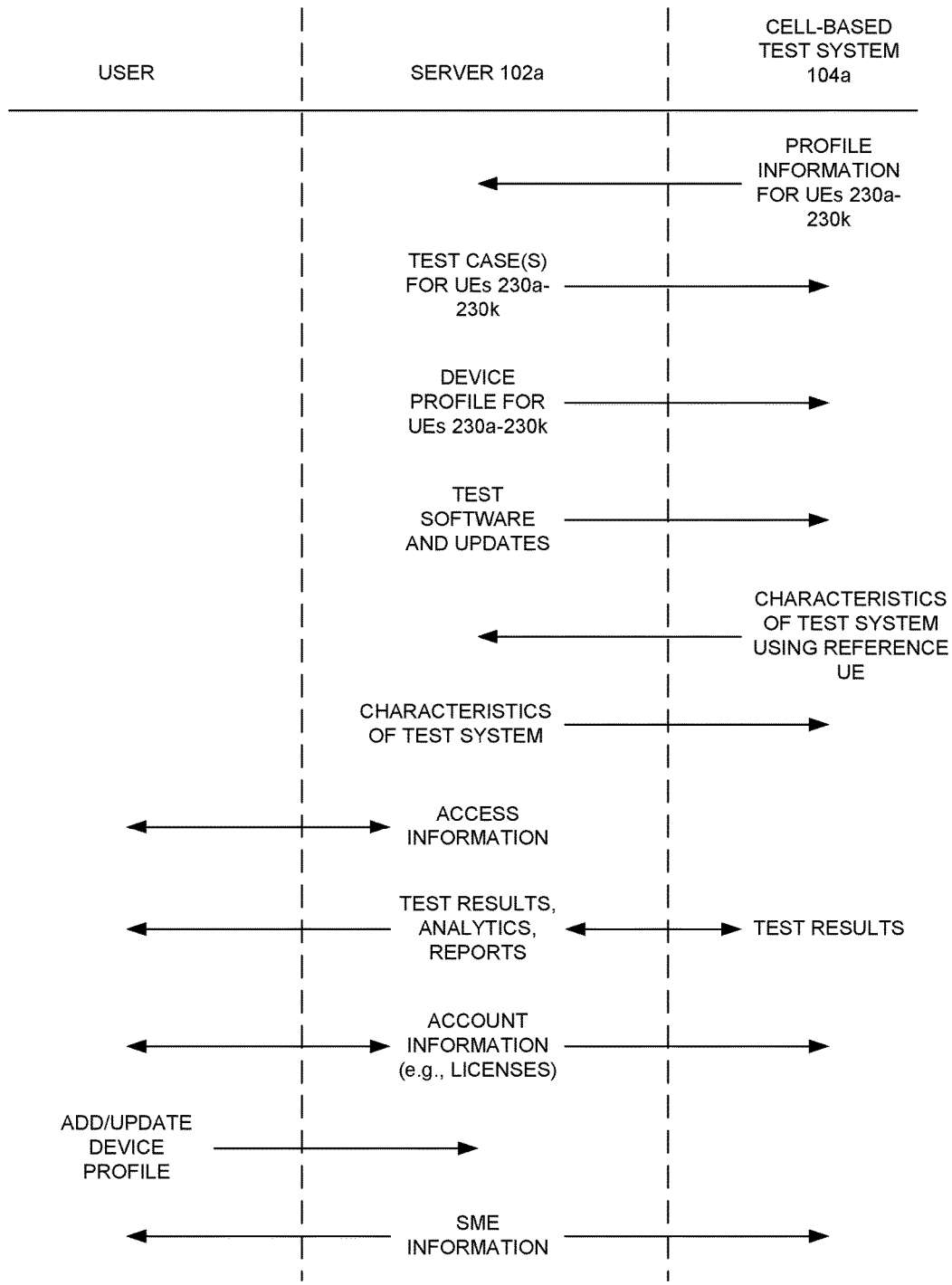
FIG. 3B illustrates examples of the types of information that are exchanged between authorized users, a server in the network (cloud), and a cell-based test system in an embodiment according to the invention.

FIG. 3B illustrates examples of the types of information that are exchanged between authorized users, a server 102a in the network (cloud) 110 (FIG. 1), and a cell-based test system 104a in an embodiment according to the invention.

For example, the cell-based test system 104a sends profile information for the UEs 230a-230k to be tested to the server 102a. In response, based on the profile information, in an embodiment, the server 102a sends test case(s) to the cell-based test system 104a. In an embodiment, the server 102a also sends device profile(s) to the cell-based test system 104a. (As mentioned above, test cases and/or device profiles can be stored locally at the cell-based test system 104a). Also, an authorized user can add device profile(s) to the server 102a and/or update existing device profile(s).

The server 102a can send test software and software updates to the cell-based test system 104a.

After operation of the cell-based test system 104a with a reference UE (after characteristics of the test system are measured using the reference UE), the test system can send information about the characteristics (the results of the measurements) to the server 102a. The server 102a can subsequently send the information about the characteristics of the cell-based test system 104a to the test system when testing is to be performed.

The server 102a can establish accounts with authorized users and issue access information (e.g., passwords) to users. Users use the access information to log into the server 102a, and can access and download account information including, but not limited to, licenses and licensing information, test results, analytics, and reports, and can also access the SME library. Also, an authorized user can add device profile(s) to the server 102a and/or update existing device profile(s).

Figure 4:
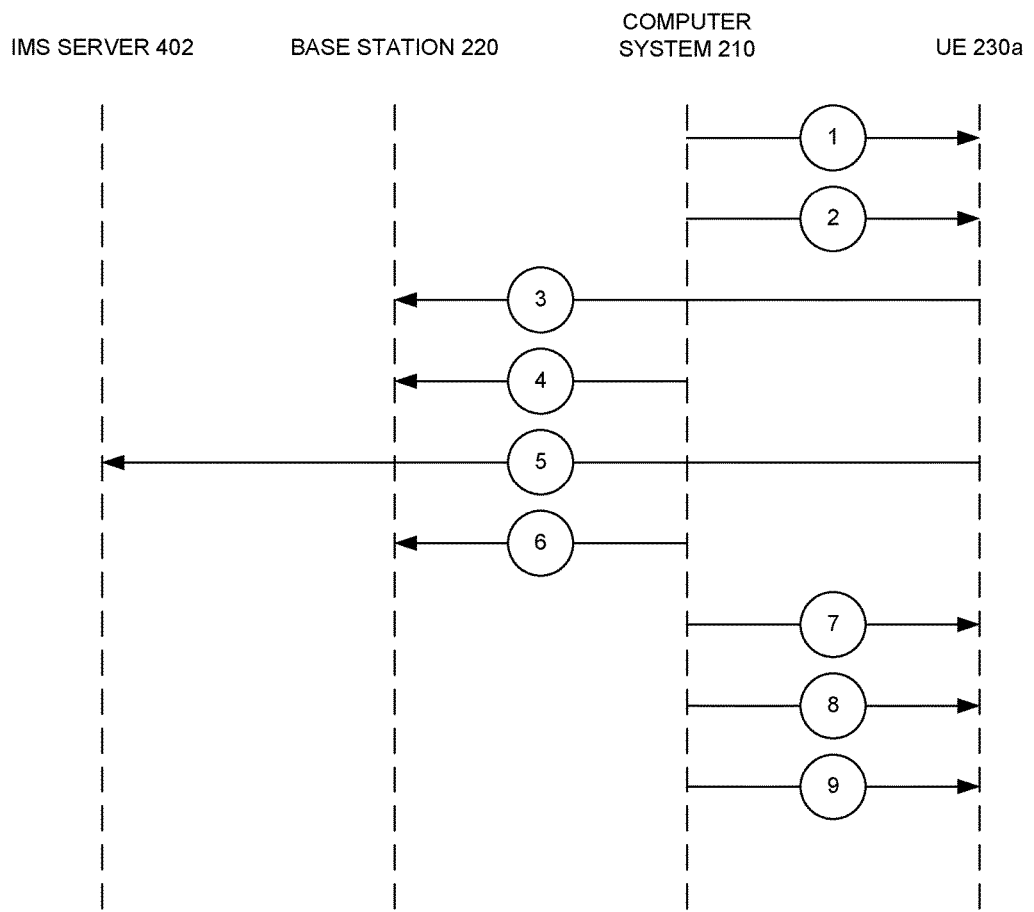
FIG. 4 is a diagram illustrating an example of certification testing performed using a cell-based test system.

FIG. 4 is a diagram illustrating an example of certification testing performed using the cell-based test system 104a. In this example, the UE 230a is a smartphone.

At operation 1, the computer system 210 sends a "turn airplane mode on" command to the UE 230a. At operation 2, the computer system 210 sends a "turn airplane mode off" command to the UE 230a.

At operation 3, the UE 230a accomplishes LTE detach followed by LTE attach. At operation 4, the computer system 210 instructs the base station 220 to verify successful LTE attach.

At operation 5, the UE 230a registers with an IMS server 402 (which may be simulated by the computer system 210). At operation 6, the computer system 210 instructs the base station to verify successful IMS registration.

At operation 7 of FIG. 4, the computer system 210 sends an AT command (plus COPN) to the UE 230a to get operator names. At operation 8, the computer system 210 sends, for example, an AT command (plus CGPIAF) to the UE 230a to print the IP address format. At operation 9, the computer system 210 sends, for example, an AT command (plus CGPIAF) to the UE 230a to modify the IP address format. Other types of commands, such as ADB commands, can be used instead of AT commands.

Figure 5:
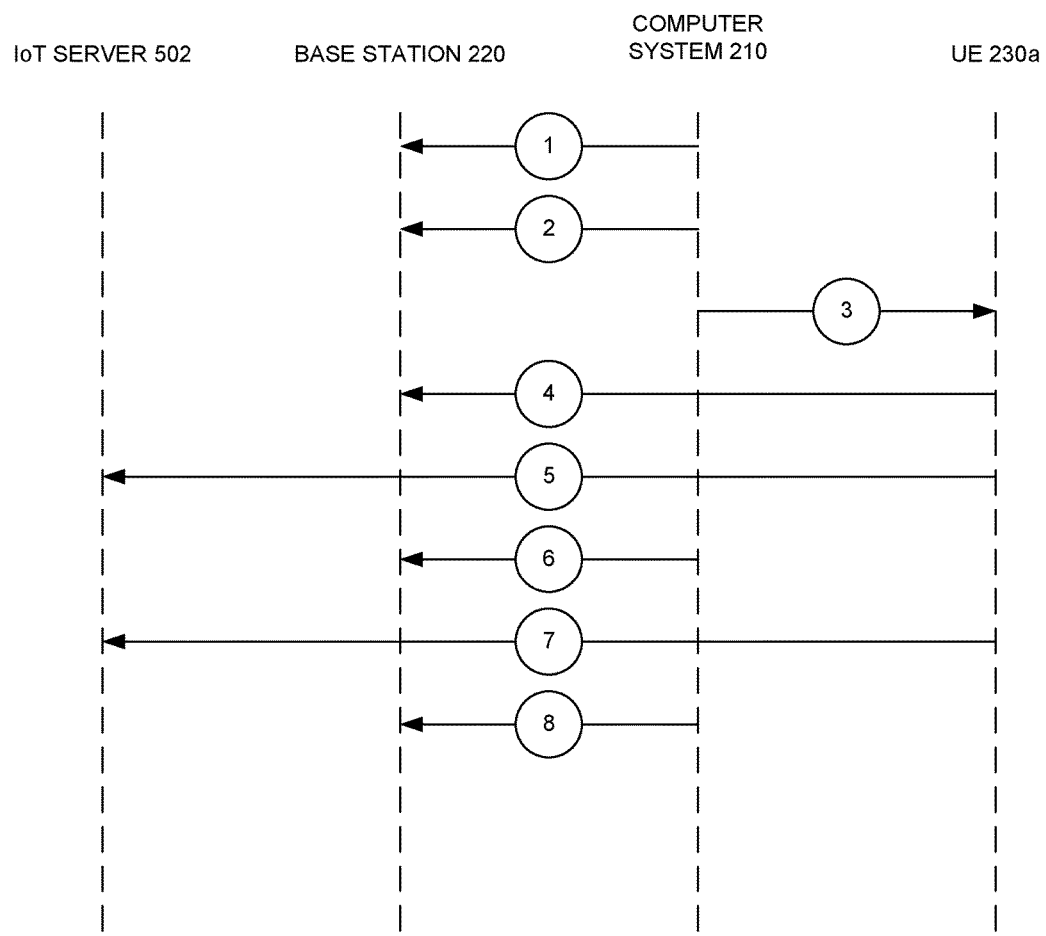
FIG. 5 is a diagram illustrating another example of a test using a cell-based test system.

FIG. 5 is a diagram illustrating an example of a test for application retry using the cell-based test system 104a. In this example, the UE 230a is an IoT device.

At operation 1, the computer system 210 instructs the base station 220 to configure an LTE band. At operation 2, the computer system 210 instructs the base station 220 to configure an Internet path.

At operation 3, the UE 230a is powered on by the computer system 210.

At operation 4, if applicable, the UE 230a accomplishes LTE attach and registration with an IMS server (not shown).

At operation 5, a path to the IoT server 502 (which may be simulated by the computer system 210) is established by the UE 230a. At operation 6, the computer system 210 instructs the base station 220 to monitor IP connectivity and pattern.

At operation 7 of FIG. 5, the UE 230a auto-registers with the IoT server 502. At operation 8, the computer system 210 instructs the base station 220 to monitor registration activity and pattern.

Figure 6:
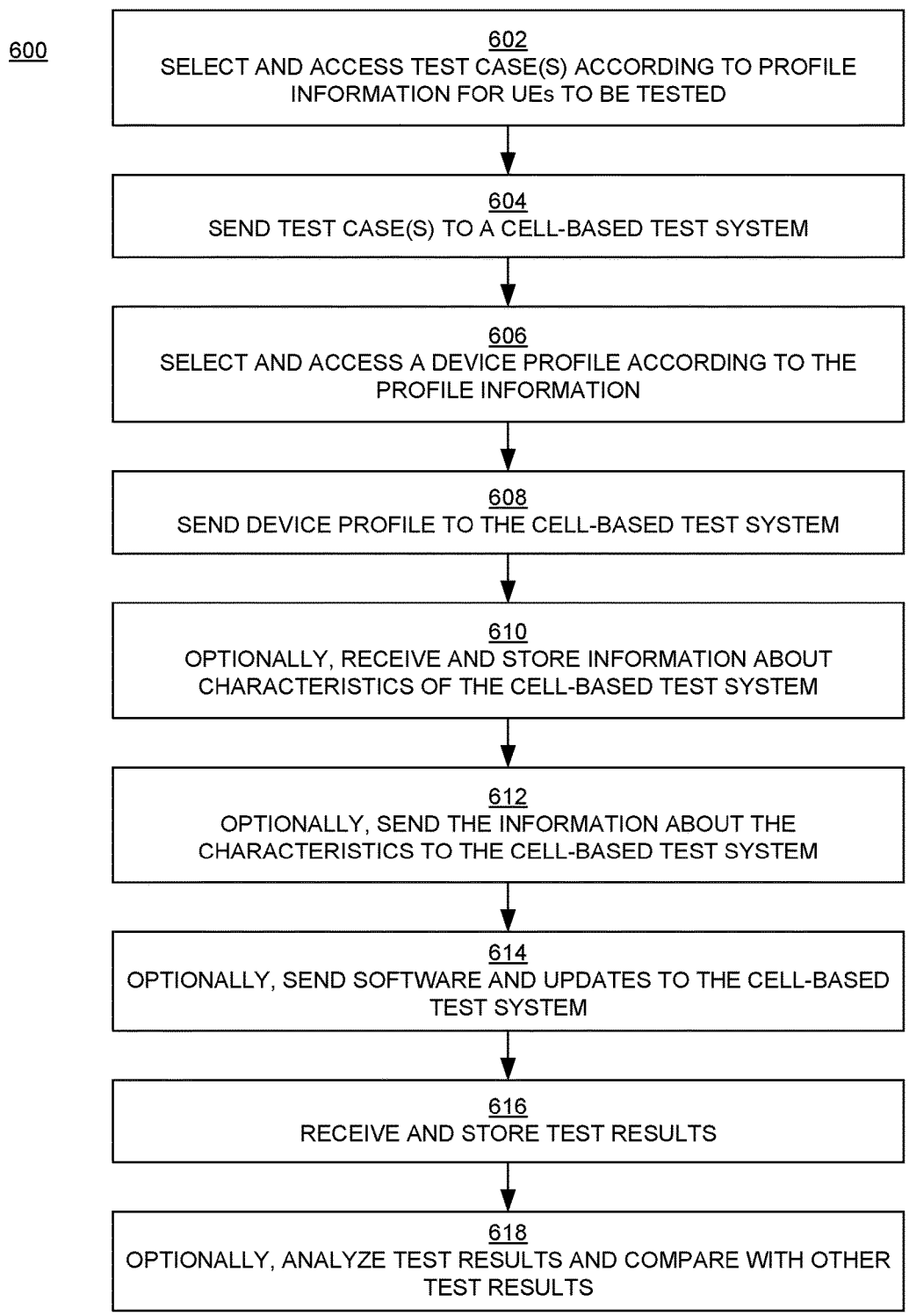
FIG. 6 is a flowchart of a computer-controlled method of managing cell-based test systems in an embodiment according to the present invention.

FIG. 6 is a flowchart 600 of a method of managing the cell-based test systems 104a-104m of FIG. 1 in an embodiment according to the present invention. All or some of the operations represented by the blocks in the flowchart 600 can be implemented as computer-executable instructions residing on some form of non-transitory computer-readable storage medium, and performed by a computer system such as the server 102a of FIG. 1.

FIG. 6 is described with reference also to FIG. 3A. Where certain elements are described in the singular in the following discussion, such discussion can be readily extended to the plural. While the blocks in the flowchart 600 are presented in a certain order, the operations described by those blocks may be performed in a different order.

In block 602, at the server 102a, a test case from a test case library 302 is selected and accessed. The test case is selected according to profile information (e.g., type, make, model, and/or features) about the user equipment 230a-230k to be tested at a cell-based test system 104a. The profile information can be sent from the cell-based test system 104a to the server 102a over the network 110.

In block 604, the selected test case is sent from the server 102a over the network 110 to the cell-based test system 104a.

In block 606, at the server 102a, a device profile from a device profile library 304 is selected and accessed. The selected device profile corresponds to the profile information about the user equipment 230a-230k to be tested at the cell-based test system 104a.

In block 608, the device profile is sent from the server 102a to the cell-based test system 104a over the network 110.

In an embodiment, reference user equipment is used to calibrate the cell-based test system 104a. In such an embodiment, in block 610, information about characteristics (e.g., the physical, protocol, and data characteristics mentioned above) of the cell-based test system 104a is received from the cell-based test system over the network 110 and stored by the test equipment manager 306 at the server 102a. Prior to the cell-based test system 104a performing the test case on the user equipment 230a-230k, that information is sent from the server 102a over the network 110 to the cell-based test system, in block 612. That information can be used to calibrate the cell-based test system 104a prior to and during testing of the user equipment 230a-230k.

In block 614, in an embodiment, software and/or software updates that can be used by the cell-based test system 104a to perform automated testing are sent from the server 102a (specifically, the test equipment manager 306) over the network 110 to the cell-based test system.

The cell-based test system 104a can then automatically perform the test case on the user equipment 230a-230k.

In block 616, results from performing the test case on the user equipment 230a-230k are received at the server 102a from the cell-based test system 104a over the network 110 and stored at the server in the test data repository 310. A report based on the test results can be prepared and stored on the server 102a in the test data repository 310, and can be accessed by authorized users. In an embodiment, access information that is used to control access to, for example, the test results stored at the server 102a is also stored at the server by the test user manager 308.

In an embodiment, in block 618, results from performing test cases on different types, makes, models, and features of user equipment at multiple cell-based test systems are received at the server 102a from those systems over the network 110. In such an embodiment, the results for the different types and models of user equipment can be compared and summarized in a report that is prepared and stored on the server 102 by the report and analytics module 312. The report is accessible to authorized users under control of the test user manager 308.

Embodiments according to the invention utilize cloud-based services to manage cell-based test systems individually and collectively. The use of cloud-based services increases the degree of test automation and decreases the amount of manual support needed. Testing can be performed at manufacturing sites, so that devices to be tested do not have to be shipped to testing laboratories.

Test results can be quickly and securely stored and accessed. Test cases can be quickly delivered on demand. The correct device profiles can be quickly identified and delivered. Software updates and new device profiles can be developed and quickly distributed. License agreements can be prepared and quickly implemented. Testing can be made more robust and feature-rich.

Overall, time-to-market and overall cost are reduced without affecting test coverage and product reliability.

Figure 7:
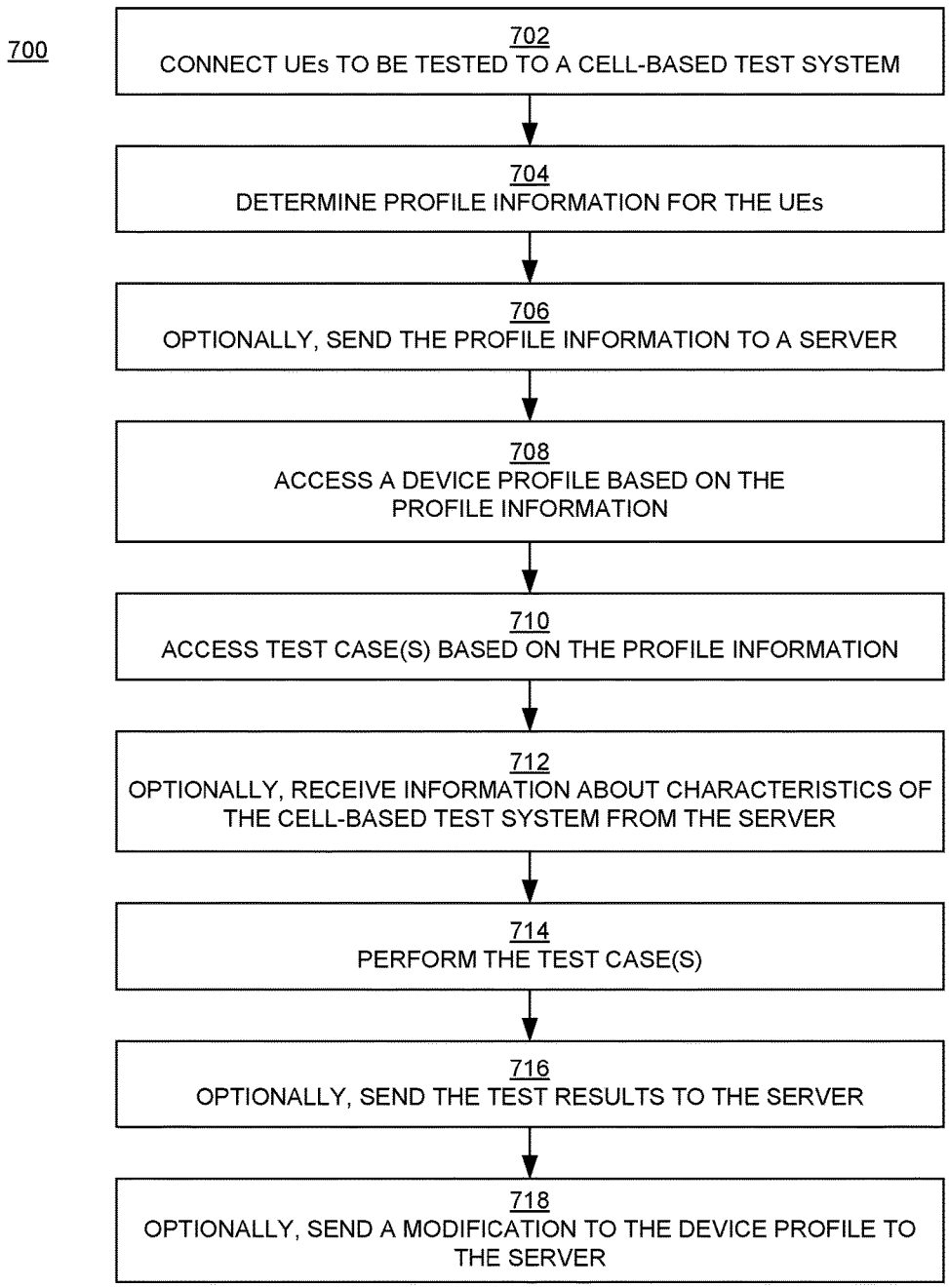
FIG. 7 is a flowchart of a computer-controlled method of testing user equipment at a cell-based test system in an embodiment according to the present invention.

FIG. 7 is a flowchart 700 of a method of testing user equipment (e.g., the user equipment 230*a*-230*k* of FIG. 2) at a cell-based test system (e.g., the cell-based test system 104*a* of FIG. 2) in an embodiment according to the present invention. All or some of the operations represented by the blocks in the flowchart 700 can be implemented as computer-executable instructions residing on some form of non-transitory computer-readable storage medium, and performed by a computer system such as the computer system 210 and test executive (e.g., the EPC) of FIG. 2.

FIG. 7 is described with reference also to FIG. 3A. Where certain elements are described in the singular in the following discussion, such discussion can be readily extended to the plural. While the blocks in the flowchart 700 are presented in a certain order, the operations described by those blocks may be performed in a different order.

In block 702, the user equipment 230*a*-230*k* to be tested is connected to the cell-based test system 104*a*. The cell-based test system 104*a* is then configured and initialized. In an embodiment, before the user equipment 230*a*-230*k* is connected to the cell-based test system 104*a*, characteristics of the cell-based test system are measured and sent to the server 102*a* over the network 110.

In block 704, profile information (e.g., type, make, model, and/or features) for the user equipment 230*a*-230*k* to be tested is detected/determined.

In block 706, in an embodiment, the profile information is sent to the server 102*a* over the network 110.

In block 708, in an embodiment, a device profile that is selected according to the profile information is received from the server 102*a* over the network 110. A user (e.g., test operator) can confirm usage of the selected device profile for test automation. In another embodiment, device profiles are stored in a local repository that can be accessed by the cell-based test system 104*a*. In general, a device profile that corresponds to the profile information for the user equipment 230*a*-230*k* to be tested is accessed, either from the server 102*a* or from the local repository.

In block 710, in an embodiment, a test case is received from the server 102*a* over the network 110. The test case is selected based on the profile information sent to the server 102*a* for the user equipment 230*a*-230*k* to be tested. In another embodiment, test cases are stored in a local repository that can be accessed by the cell-based test system 104*a*. In general, a test case that corresponds to the profile information for the user equipment 230*a*-230*k* to be tested is accessed, either from the server 102*a* or from the local repository.

In block 712, in an embodiment, the information about the characteristics of the cell-based test system 104*a* is received from the server 102*a* over the network 110.

In block 714, the test case is performed on the user equipment 230*a*-230*k*. During performance of the test case, in an embodiment, the information about the characteristics of the cell-based test system 104*a* that is received from the server 102*a* can be used to calibrate the cell-based test system 104*a*. During performance of the test case, the user equipment 230*a*-230*k* is controlled according to the device profile in response to the software executing on the computer system 210. Thus, the information from the downloaded test profile is used by the cell-based test system 104*a* to perform appropriate test automation during execution of the test case.

In block 716, in an embodiment, results from performing the test case on the user equipment 230*a*-230*k* are sent to the server 102*a* over the network 110.

In block 718, in an embodiment, a modification to the device profile is received from a user. The modification can be sent to the server 102*a* over the network 110.

Storing device profiles on a server (in the cloud) provides a number of benefits and advantages. The correct device profiles can be quickly identified and delivered. New device profiles can be developed, validated, and quickly and widely distributed. Storing devices in a local repository at the cell-based test system is also advantageous. For example, device profiles can be accessed even if there is no connectivity to the cloud.

Furthermore, as described above, the intelligence included in device profiles in embodiments according to the invention solves the challenges associated with automated testing of user equipment in which the automation does not follow a single standard mechanism but instead has multiple automation modes.

Figure 8:
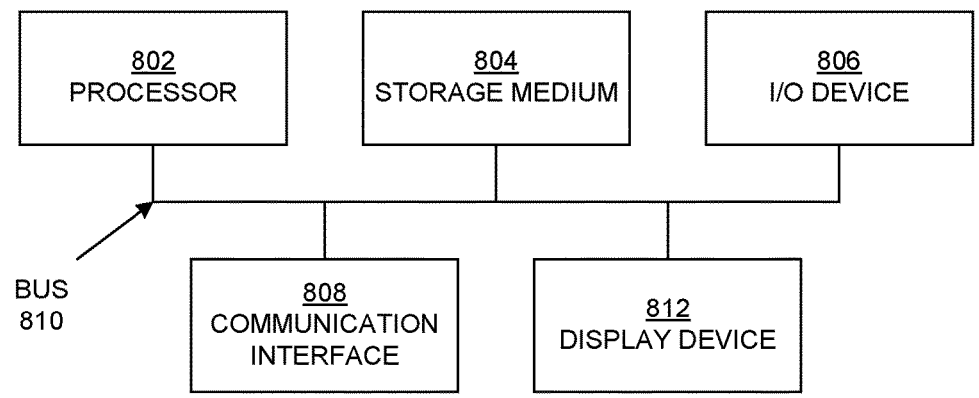
FIG. 8 is a block diagram illustrating elements of a computer system in an embodiment according to the present invention.

FIG. 8 is a block diagram illustrating elements of a computer system 800 in an embodiment according to the present invention. In an embodiment, the computer system 800 represents a platform for implementing the server 102*a* of FIG. 1, and the computer system 210 and computer system 212 of FIG. 2.

The computer system 800 broadly includes any single or multi-processor computing device or system capable of executing computer-readable instructions. In its most basic configuration, the computer system 800 may include at least one processing circuit (processor) 802 and at least one storage medium 804. The processor 802 generally represents any type or form of processing unit or circuit capable of processing data or interpreting and executing instructions. In an embodiment, the processor 802 receives instructions from a software application or module. The storage medium 804 generally represents any type or form of volatile or non-volatile storage device or medium capable of storing data and/or other computer-readable instructions.

The computer system 800 may also include one or more components or elements in addition to the processor 802 and storage medium 804. For example, the computer system 800 may include an input/output (I/O) device 806, such as a keyboard and mouse, and a communication interface 808, each of which may be interconnected via a communication infrastructure (e.g., a bus 810). The computer system 800 may also include a display device 812.

The communication interface 808 may be any type or form of communication device or adapter capable of facilitating communication between the computer system 800 and one or more other devices including a network of other devices. The communication interface 808 can include, for example, a receiver and a transmitter that can be used to receive and transmit information (wired or wirelessly).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. As mentioned above, while the steps illustrated and/or described herein may be shown or discussed in a particular order, these steps do not necessarily need to be performed in the order illustrated or discussed. Also, the various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A method of testing user equipment at a cell-based test system, the method comprising:
   determining a type of user equipment to be tested at the cell-based test system, wherein the cell-based test system comprises a portable test unit and a computer system coupled to the portable test unit, wherein the portable test unit comprises a shielded box configured to contain the user equipment to be tested, and wherein the computer system is operable for executing software that automatically performs testing on the user equipment;
   accessing a device profile for the type of the user equipment to be tested, wherein the device profile comprises a test script operable for controlling the user equipment during the testing, and wherein the device profile is operable for changing from a first automation mode comprising a command used by a first operating system to a second automation mode comprising a command used by a second, different operating system;
   measuring a characteristic of the cell-based test system using reference user equipment;
   sending, to a server over a network, information comprising a result of said measuring, wherein the information comprising the result is stored at the server;
   receiving the information comprising the result from the server over the network;
   using the information comprising the result received from the server to calibrate the cell-based test system; and
   performing a test of the user equipment using the portable test unit, wherein during the test the user equipment is controlled according to the device profile in response to the software executing on the computer system.

2. The method of claim 1, further comprising:
   after said determining and before said accessing, sending profile information identifying the type of the user equipment to a server over a network; and
   receiving, from the server over the network, the device profile selected according to the profile information.

3. The method of claim 2, further comprising:
   receiving an input comprising a modification to the device profile; and
   sending the modification to the server over the network.

4. The method of claim 1, wherein the device profile is stored in and accessed from a memory of the computer system.

5. The method of claim 1, further comprising receiving a test case from a server over a network, wherein the test case is selected according to the type of the user equipment, wherein the test performed on the user equipment is performed according to the test case.

6. The method of claim 5, further comprising sending, to the server over the network, results from performing the test case on the user equipment.

7. A system comprising a cell-based test system, the system comprising:
   a portable test unit comprising a shielded box configured to contain the user equipment to be tested; and
   a computer system coupled to the portable test unit and operable for communicating with a server over a network, wherein the computer system is further operable for performing operations comprising:
   determining a type of user equipment to be tested at the cell-based test system, wherein the cell-based test system comprises a portable test unit and a computer system coupled to the portable test unit, and wherein the computer system is operable for executing software that automatically performs testing on the user equipment;
   accessing a device profile for the type of the user equipment to be tested, wherein the device profile comprises an application program interface operable for controlling the user equipment during the testing by adapting the software to the type of the user equipment, and wherein the device profile is operable for changing from a first automation mode comprising a command used by a first operating system to a second automation mode comprising a command used by a second, different operating system;

measuring a characteristic of the cell-based test system using reference user equipment;

sending, to the server over the network, information comprising a result of said measuring, wherein the information comprising the result is stored at the server;

receiving the information comprising the result from the server over the network;

using the information comprising the result received from the server to calibrate the cell-based test system; and performing a test of the user equipment using the portable test unit, wherein during the test the user equipment is controlled according to the device profile in response to the software executing on the computer system.

8. The system of claim 7, wherein the computer system is further operable for performing operations comprising:

after said determining and before said accessing, sending profile information identifying the type of the user equipment to the server over the network; and receiving, from the server over the network, the device profile selected according to the profile information.

9. The system of claim 8, wherein the computer system is further operable for performing operations comprising:

receiving an input comprising a modification to the device profile; and sending the modification to the server over the network.

10. The system of claim 7, wherein the device profile is stored in and accessed from a memory of the computer system.

11. The system of claim 7, wherein the computer system is further operable for performing operations comprising receiving a test case from a server over a network, wherein the test case is selected according to the type of the user equipment, wherein the test on the user equipment is performed according to the test case.

12. The system of claim 7, wherein the computer system is further operable for performing operations comprising sending, to the server over the network, results from performing the test case on the user equipment.

13. A system comprising a server in a network, the server comprising:

a processor;

a communication interface coupled to the processor and operable for communicating with a plurality of cell-based test systems over the network; and a memory coupled to the processor, wherein the memory has stored therein a plurality of modules that, when executed, perform operations for managing the plurality of cell-based test systems, the modules comprising:

a device profile library comprising a plurality of device profiles for different types of user equipment, wherein a device profile is selected and accessed from the device profile library according to profile information about a type of user equipment to be tested at a cell-based test system of the plurality of cell-based test systems and sent to the cell-based test system over the network, and wherein the device profile is operable for changing from a first automation mode comprising a command used by a first operating system to a second automation mode comprising a command used by a second, different operating system, wherein the cell-based test system comprises a portable test unit and a computer system coupled to the portable test unit, wherein the portable test unit comprises a shielded box configured to contain the user equipment to be tested, and wherein the cell-based test system is operable for automatically performing a test on the user equipment, wherein during the test the user equipment is controlled according to the device profile in response to the software executing on the computer system; and prior to performing the test, measuring a characteristic of the cell-based test system using reference user equipment;

sending, to the server over the network, information comprising a result of said measuring, wherein the information comprising the result is stored at the server;

receiving the information comprising the result from the server over the network; and using the information comprising the result received from the server to calibrate the cell-based test system.

14. The system of claim 13, wherein the server receives the profile information about the type of user equipment from the cell-based test system over the network.

15. The system of claim 13, wherein the server receives an input comprising a modification to the device profile, wherein a modified version of the device profile incorporating the modification is added to the device profile library in response to validation of the modification.

16. The system of claim 13, wherein the device profile is operable for changing from a first automation mode comprising a command used by a first operating system to a second automation mode comprising a command used by a second, different operating system.

17. The method of claim 1, wherein the reference user equipment has known communication characteristics and is configured to simulate at least a portion of the user equipment's functionality.

18. The system of claim 7, wherein the reference user equipment has known communication characteristics and is configured to simulate at least a portion of the user equipment's functionality.

* * * * *